(12) United States Patent
Brunswig et al.

(10) Patent No.: US 7,984,020 B2
(45) Date of Patent: Jul. 19, 2011

(54) SYSTEM AND METHOD FOR BUSINESS OBJECT SYNC-POINT AND ROLLBACK FRAMEWORK

(75) Inventors: Frank Brunswig, Heidelberg (DE); Michael Meyringer, Rauenberg (DE); Adam Polly, Stutensee (DE); Matthias Richter, Sinsheim (DE)

(73) Assignee: SAP AG, Walldorf (DE)

( * ) Notice: Subject to any disclaimer, the term of this patent is extended or adjusted under 35 U.S.C. 154(b) by 608 days.

(21) Appl. No.: 11/951,393

(22) Filed: Dec. 6, 2007

(65) Prior Publication Data

US 2009/0150473 A1 Jun. 11, 2009

(51) Int. Cl.
G06F 7/00 (2006.01)
G06F 17/00 (2006.01)
(52) U.S. Cl. ............... 707/649; 714/2; 714/19
(58) Field of Classification Search .................. None
See application file for complete search history.

(56) References Cited

U.S. PATENT DOCUMENTS

| | | | | |
|---|---|---|---|---|
| 5,297,279 | A * | 3/1994 | Bannon et al. | 707/792 |
| 5,630,124 | A * | 5/1997 | Coyle et al. | 1/1 |
| 5,873,096 | A * | 2/1999 | Lim et al. | 1/1 |
| 6,349,361 | B1 * | 2/2002 | Altman et al. | 711/121 |
| 6,631,374 | B1 * | 10/2003 | Klein et al. | 707/638 |
| 6,647,510 | B1 * | 11/2003 | Ganesh et al. | 714/16 |
| 6,816,873 | B2 * | 11/2004 | Cotner et al. | 1/1 |
| 6,820,099 | B1 * | 11/2004 | Huber et al. | 707/649 |
| 7,103,597 | B2 * | 9/2006 | McGoveran | 1/1 |
| 7,143,122 | B2 * | 11/2006 | Burton et al. | 707/613 |
| 7,162,601 | B2 * | 1/2007 | Yamagami | 711/162 |
| 2004/0068501 | A1 * | 4/2004 | McGoveran | 707/8 |
| 2004/0221030 | A1 * | 11/2004 | Huras et al. | 709/224 |
| 2006/0190702 | A1 * | 8/2006 | Harter et al. | 712/15 |
| 2009/0063579 | A1 * | 3/2009 | Chan et al. | 707/202 |

OTHER PUBLICATIONS

Mandal et al., Concurrent CheckPoint Initiation and Recovery Algorithms on Asynchronous Ring Networks, Feb. 2004, Elsevier, Journal of Parallel and Distributed Computing 64, pp. 649-661.*

Yi et al., A Rollback Recovery Algorithm for Intrusion Tolerant Intrusion Detection System, 2004, Springer-Verlag Berlin Heidelberg, Computational Science and Its Applications—ICCSA 2004—Lecture Notes in Computer Science, pp. 584-593.*

* cited by examiner

Primary Examiner — Charles Kim
Assistant Examiner — Richard Bowen
(74) Attorney, Agent, or Firm — Kenyon & Kenyon LLP

(57) ABSTRACT

A method and system for allowing a rollback within a multi-object system infrastructure are provided. In embodiments, a rollback to a state of a software business object is effected. A sync point manager maintains, for example, a list of sync points and their respective associated identifiers and relationship data. When under sync point protection, i.e., a sync point is set, each subsequent object, when created, is requested to prepare a buffer associated with the specific sync point, so that if an error occurs, a request to rollback to the state associated with the sync point is effectable. Multiple sync points may be kept track of by the sync point manager. In further embodiments, the sync points may be associated with a variety of different types of objects.

20 Claims, 7 Drawing Sheets

FIG. 2

SYSTEM AND METHOD FOR BUSINESS OBJECT SYNC-POINT AND ROLLBACK FRAMEWORK

BACKGROUND

Modern firms use complex business systems to define and perform the business processes used by the firms. The business system typically includes a variety of backend applications to perform related tasks and define related processes, such as inventory management, employee management, customer relations, etc. Each application makes use of a variety of business objects, which contain data and business logic to manipulate the data.

Users of such complex systems may encounter situations in which they wish to return to a specific state of their document or file. Oftentimes, this wish is unfulfilled given the needs of the system in use. Instead, current legacy systems involving such a variety and large amount of business objects are unable to provide an opportunity to a user to return to a specific state of their document or file. Thus, the functionality of such systems is limited by the complexity of the backend applications.

Thus, there is a need in the art for a uniform, flexible way to access and go back to an earlier version of a documents and/or application within a myriad of business objects in a legacy system.

BRIEF DESCRIPTION OF THE DRAWINGS

FIG. 2 shows a screenshot of an example embodiment of the present invention.

DETAILED DESCRIPTION

Figure 1:
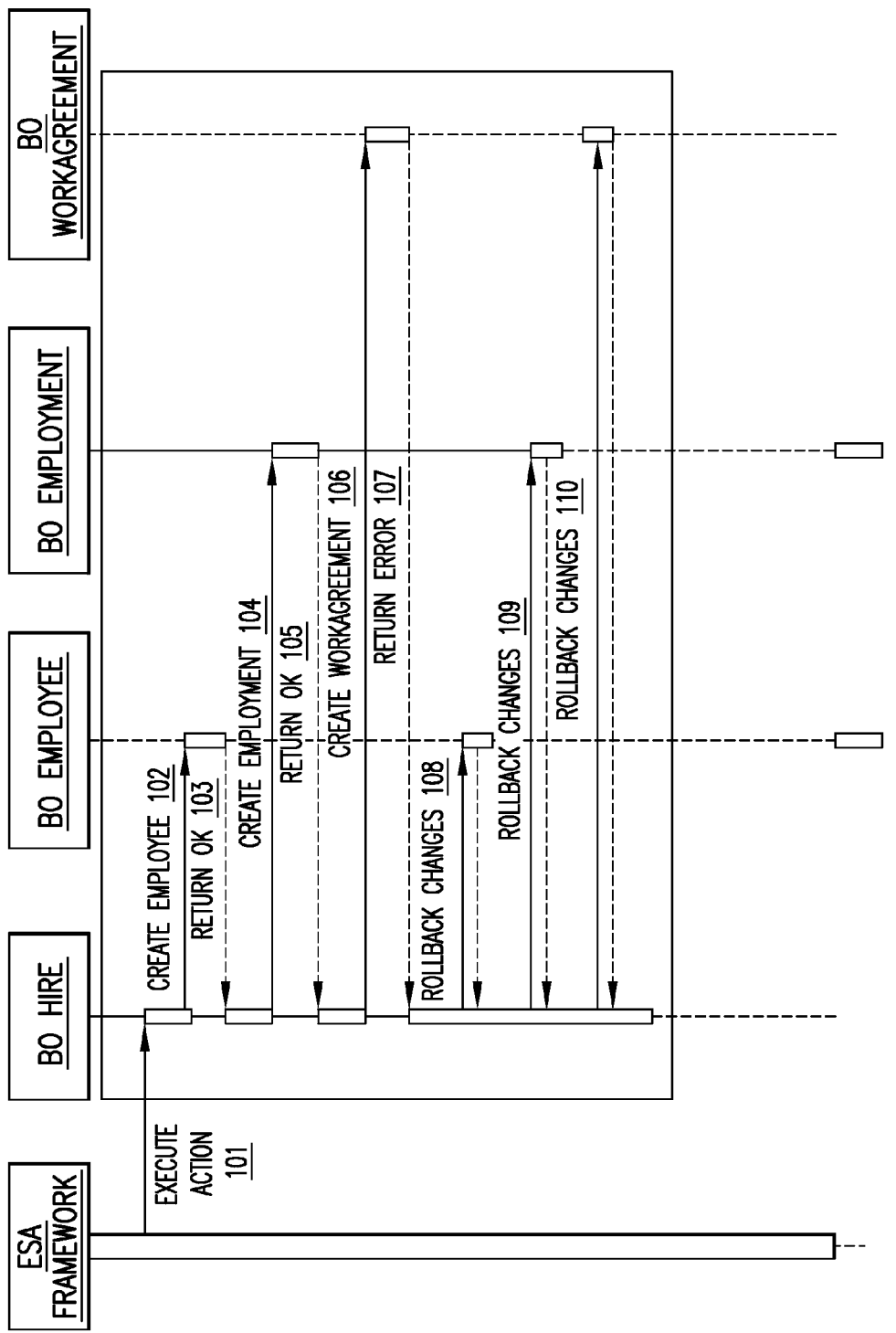
FIG. 1 shows an example embodiment according to the present invention.

Methods and systems having sync-point and rollback mechanisms within large systems employing several software business objects are provided. Such large systems may have, for example, an enterprise services infrastructure. A sync-point is related to the state of a software business object. The state of the software business object may involve data and/or other resources, e.g., locks of business objects. The sync-point may be set, for example, by a consumer, the framework, the application itself, and a user via an interface. For example, in certain situations such as an error situation or the appearance of an error situation, a service management or consumer may request a rollback to a dedicated sync-point.

A requested rollback to a dedicated sync-point involves essentially a revoking of changes already made to an object or business object. For example, a consumer and predefined framework driven points in time like the finalize or save phase can request such a sync-point so that all changes done since that predefined point in time could be rolled back if needed. In a legacy system, such a rollback requires informing all newly initialized business objects if the transaction is running under a sync-point protection, and informs all business objects involved in the transaction if a rollback is requested.

The use of sync-points and rollback can have several uses in any software system. For example, such use may provide a more tolerant error handling mechanism on the consumer side. In embodiments of the present invention, such use may provide an application programming model for the consumer which is more straight-forward. For example, additional application provider pre-validation may not be required. Instead, a consumer may be permitted to set the sync-point, decide whether to execute changes, and return to a specific defined state in the event of error. Thus, embodiments of the present invention may simplify application programs for use by a consumer.

In an embodiment of the present invention, the sync-point and rollback method and system are independent of the enterprise services framework. However, the sync-point and rollback functionality is provided by a sync-point and rollback manager ("SPR manager"). The SPR manager can be used by an enterprise services framework. Further, the SPR manager can be used by reuse components.

In an embodiment of the present invention, a sync-point and rollback can be triggered by business objects, by the service manager at dedicated points in time in the phase model, or, for example, by the consumer (e.g., user interface, process agent). In an embodiment of the present invention, business object service provider triggered sync-points can be nested. Such sync-points can exist inside a system sync-point or inside the consumer triggered sync-points.

In an embodiment of the present invention, the sync-point and rollback mechanism requires a separate phase model describing the states at which the triggering of sync-point(s) and rollback is allowed. In a further embodiment, the lifetime of the sync-point(s) must be aligned with this state model. In a further embodiment, the states at which the sync-points will be removed are defined. For example, in the enterprise services framework (ESF), the state model for the sync-points are integrated into the state model of the ESF. In a further embodiment, the constraints and contracts concerning user sync-points set by the consumer and system sync-points set by the service manager are clarified. For example, a system sync-point such as the finalize or save phase shown in FIG. 3, the setting of the sync point and the close or rollback is defined by the service manager phase model and the trigger is under responsibility of the service manager.

"Object" and "business object" are used throughout the specification to refer to all types of "business objects" defined in, for example, an enterprise services framework, including, e.g., business objects, dependent objects, transformed objects, and controller objects.

FIG. 1 shows an example embodiment according to the present invention. In this example embodiment, the interaction between four business objects (BO) within an enterprise services architecture (ESA) for an example hiring of an employee are shown 101. In a system, for example there may be a process object, e.g., entitled BO_Hire, that collects data for several master data objects including: BO_Employee 102, 103; BO_Employment 104, 105; and BO_WorkAgreement 106, 107, and that provides an approval process for the hiring of an employee. When the data is determined consistent, then an approve action may be triggered automatically or manually. This approval causes the creation of new master data objects Employee, Employment, and WorkAgreement. If, for example, one of the master data objects cannot be created and/or raises an error, e.g., the return error 107 for BO_WorkAgreement, then all changes done during the approve action shall be removed and the status will not be set to approve 108, 109, 110. The corrections may be made automatically or manually in the PersonnelHiring object and the approve action may be triggered again.

Figure 2:
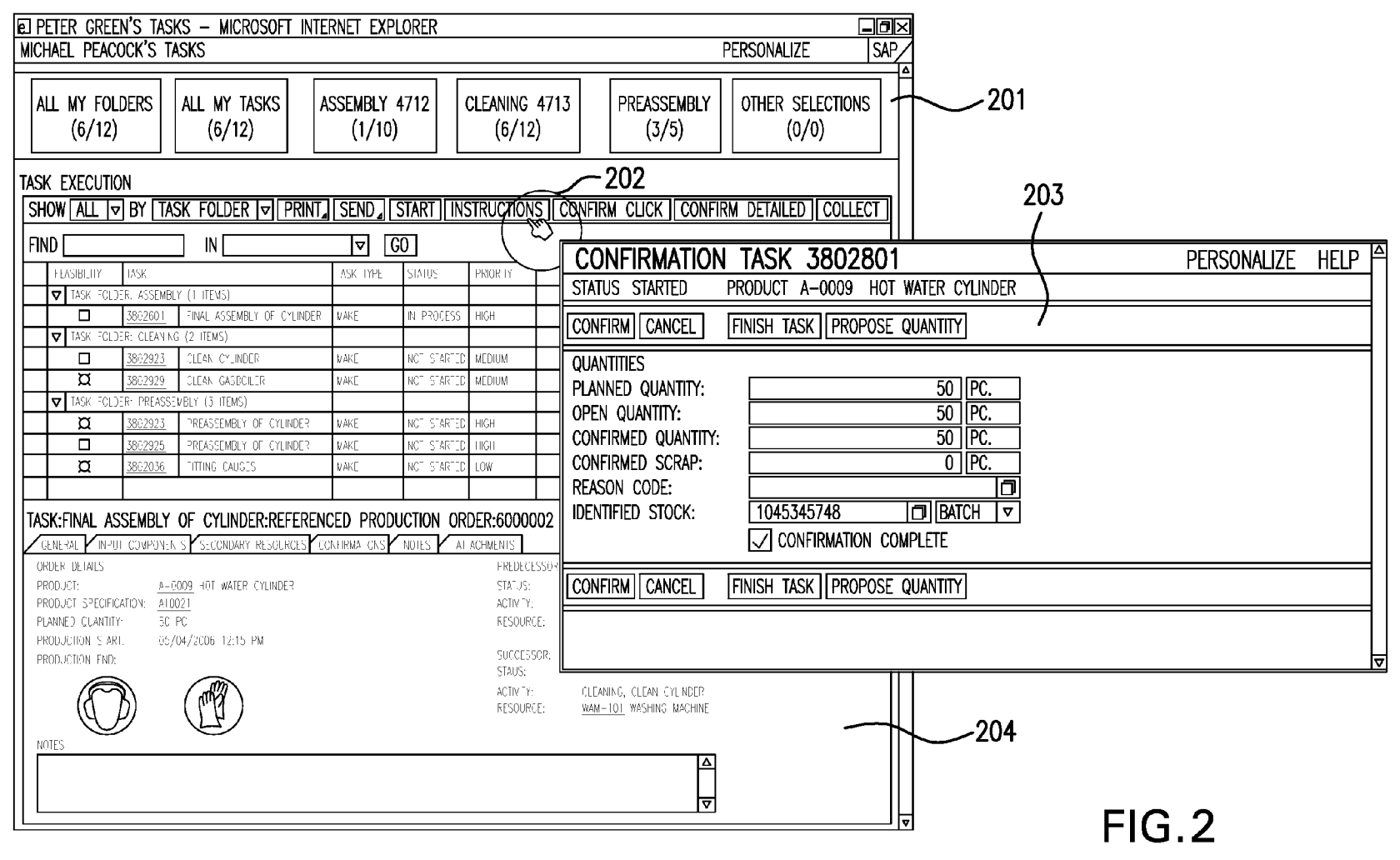

FIG. 2 shows a screenshot of an example embodiment of the present invention. In this example, a user or worker may navigate via site logistics or production tasked 201, and can confirm 202 activities or operations in a lot and report back on materials and quantities. Such confirmation involves communication with an associated backend system. For example, such activities or operations may be tasks assigned to workers needing finishing or completion. Or, for example, such activities or operations may concern inbound and outbound delivery of inventory or goods. Within the user interaction, the user or worker may adjust or correct the material or the quantity during the transaction 203. As a result of this confirmation process, adjustments for open quantities in production or site logistics order and the production or site logistics request as well as adjustments in the inventory are required. The information is displayed to a user, for example, in a tabbed display to indicate the information associated with, e.g., a production order made 204.

Figure 3:
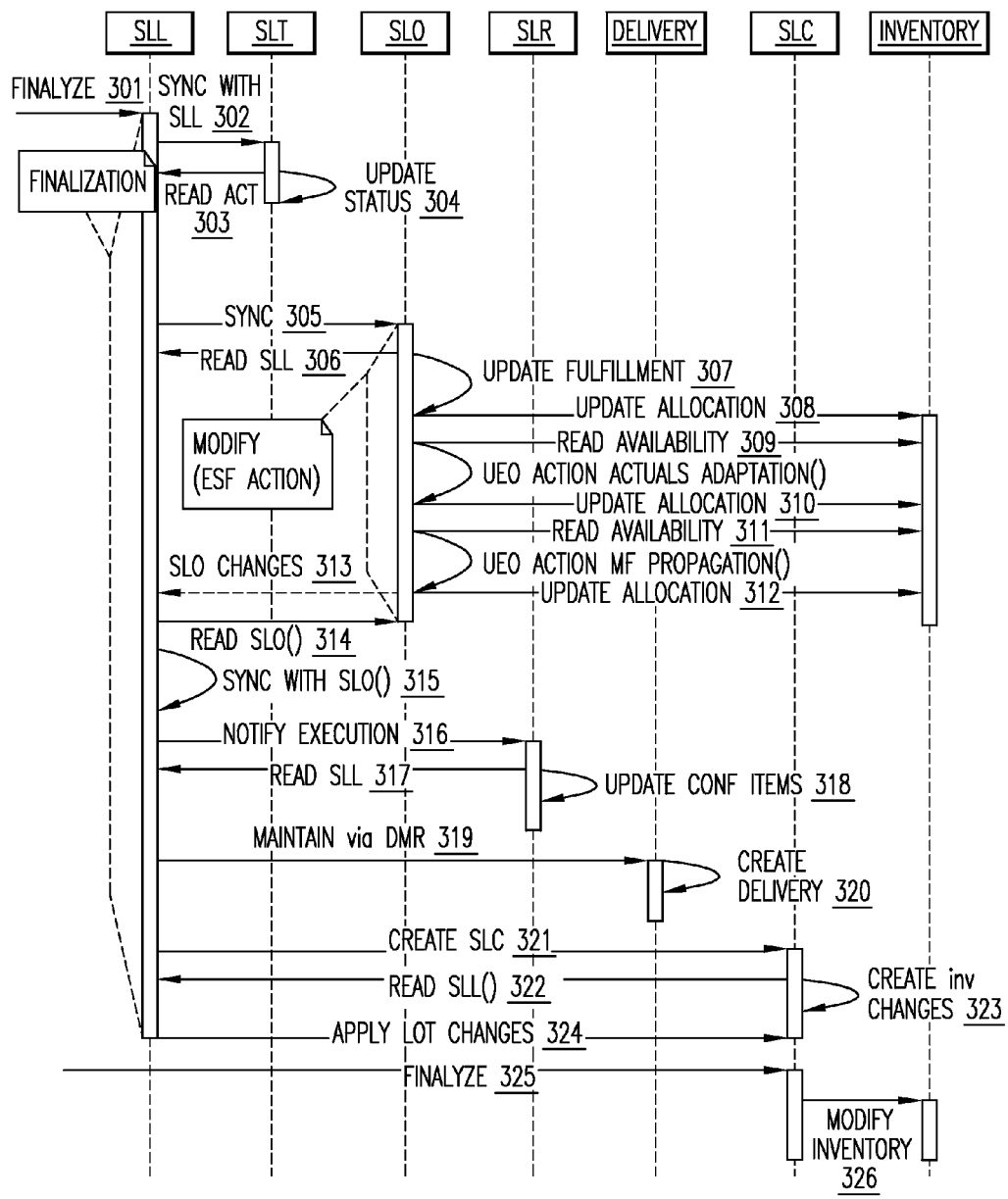
FIG. 3 shows a sequence diagram illustrating an exemplary framework of the present invention.

FIG. 3 shows a sequence diagram illustrating an exemplary framework of the present invention. In some situations, there may be high throughput situations, e.g., a system involving many business objects. For such situations, an update of business objects may be arranged so that such updates only take place during, for example, a finalize phase in order to minimize the amount of locking times. Upon execution of a finalize or completion phase, one may find that due to business checks (e.g., material shortage in inventory) or locks in parallel sessions or other reason(s), an update to an involved business object fails. The session needs to return to a consistent state so that the appropriate adjustments/corrections may be inputted so that the work may continue. This update to the business objects during, e.g., a finalize phase, spans across multiple business object types. Thus, a rollback to the state at the beginning of the finalize phase is required when an update to an involved business object fails.

In FIG. 3, an example of required update processes for the site logistics lot confirmation process in a save or finalize phase is illustrated. Certain references such as SLT and SLL are used in this example which refer to different possible objects in a project, and are used here for exemplary purposes. These references may be named with any desired nomenclature for a given project. Upon commencement of a finalize or save action 301, a sync 302 with a first object SLT, for example, is effected, and a read 303 of the action is returned to the SLL (site logistics lot) object. A status of the first object SLT is then updated 304. In order to change status, an object needs to modify other business objects during an action or during a finalize phase. If an object that should have been modified raises errors or cannot be locked, the object will need a rollback of the changes. However, for example, a save of any changes done to the object(s) prior to the rollback or before the finalize call may be wished to be saved. In the example shown, a sync 305 and read 306 is effected with another object (e.g., SLO). In the enterprise services framework, a modify action may be effected on an object (e.g., SLO). In this example, inventory or other business matter must be checked; thus, various actions may take place including an update of the fulfillment of the goods 307, an update of allocation of the goods 308, a read on the availability of the goods 309, UEO Action Actuals adoption, a subsequent update of allocation of goods 310, a subsequent read on the availability of the goods 311, UEO Action MF propagation, and a subsequent update of the allocation of goods 312. Upon such modification, changes to the SLO object 313 are communicated back to the SLL, and a read of the SLO object 314 is effected. Upon the read, the SLO syncs the data 315. A notify execution is sent from the SLL object to an appropriate object, e.g., SLR, 316, and a read is effected 317. Upon the read, an update is effected on the SLR object 318. The data is maintained 319 and a delivery object is created 320. The SLC object 321 is created and reads the SLL object 322. The SLC object creates any inventory changes 323, and lot changes are applied 324 from the SLL object. Once all changes are appropriately made, a finalize action occurs 325, and the SLL object in response effects the modification of the inventory 326.

In an embodiment, in a single-level approach with user sync-points, a sync-point manager must take care of the currently active sync-point state. The contract for the sync-point user is defined describing the resulting state of the single sync-point. In the multi-level sync-point scenario, the sync-points follow a stack paradigm for business object (BO) service provider triggered sync points. In an embodiment, a request of sync points and rollbacks are explicitly triggered by the consumer/requestor. A further embodiment shows, that only the requester of a sync point is able to trigger a rollback for the last sync point of the stack. In a further embodiment, the close of a sync point shall be triggered automatically when the core service method is closed from which the sync point has been requested.

Figure 4:
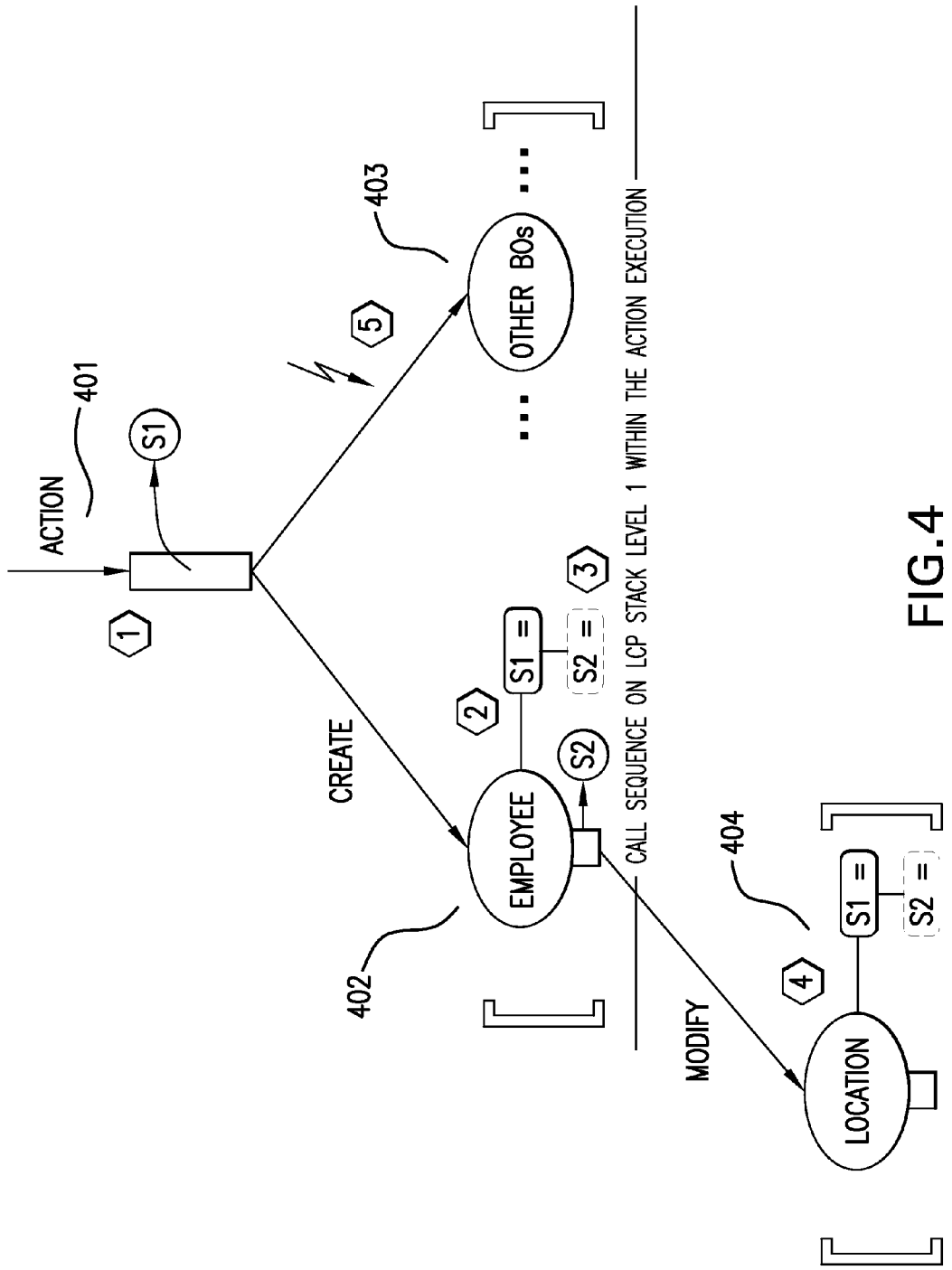
FIG. 4 shows an embodiment having stacked multiple sync-points according to the present invention.

FIG. 4 shows an embodiment having stacked multiple sync-points according to the present invention. At 401, the service provider set a sync-point S1 and starts the execution of an action. Many business objects are involved. A employee business object is created, and a subsequent sync-point S2 402 following the creation is set. If the employee business object effects a modification, e.g., on location, an addition sync-point may be set following the modification 404. Likewise, for other business objects, after creation of the business objects, respective sync-points may be set for each of the business objects 403.

In an embodiment of the present invention, the status and action management of a system is involved in the sync-points and aware of a potential rollback request. In a further embodiment, various handlers, e.g., the change handler or the message handler, manage their respective entities, e.g., change notification or messages, in an appropriate way. For example, for messages, the exact behavior, e.g., reason for which a rollback may occur (e.g., error message) of the message manager is described.

In an embodiment, administration of all the sync-points is managed by a sync-point manager for the system or application or sub-application. All service providers may support sync-points using the various embodiments of the present invention. For example, in an ESF, the beginning of the finalize phase shall be a predefined finalize system sync-point. The consumer (e.g., the user interface/controller object) or a business object can also request a sync-point and a rollback within the finalize phase. The sync-point and rollback feature may be provided as a multi-level capability including situations involving an undo situation. The sync-point has a unique identifier within the transaction. The identifiers are managed by the sync-point manager. In an embodiment, the sync-point requester receives a reference to an interface and the identifier of the sync-point. The interface provides the rollback and close operation. The service providers which are running under control of the sync-point only see the sync-point identifier, but cannot request a rollback or close of a sync-point.

In an embodiment, by the end of a provider method SAVE or alternative with a new method within the service providers, all open sync-points may be removed. For the service consumer (user interface) after the successful save, all sync-points are removed. In the case of a rejected save, for example, all sync-points are still available. Reuse Services including buffering and own persistence have to be triggered by the business objects in the save sequence. In an alternative embodiment, if the business object has registered onto the sync point manager on its own, the business object receives an independent close event for all sync points from the sync point manager.

In an embodiment, an event after a rejected save, e.g., named AFTER_REJECTED_SAVE, is the counterpart rollback of the finalize system sync-point. In an embodiment, after the rejected save, there may be still open sync points that have been request by the service consumer prior to the save sequence start. In an embodiment, the sync-point and rollback feature is available for all stateful objects. All participants, e.g., ESI objects, reuse components, that have not been loaded when the sync-point was set, obtain sync-point information when they are accessed. In an embodiment, the multi-level incorporated registering is a part of the framework. In an embodiment, the ESI objects, for example, may request a sync-point when needed to bundle a set of cross-business object modifications e.g., actions, create, updates, and deletes, that must be rolled back as a whole in case of errors.

In an embodiment, the sync-point requestor that owns a sync point may enforce a rollback of all changes done under this sync-point protection. The rollback cannot be triggered by other objects than the requestor which must be guaranteed by the sync-point manager. In an embodiment, the ESI change handler removes the announced changes in case of a rollback and inform the consumers including controller objects about these changes. In an embodiment, the ESI message handler shall remove the announced messages in case of a rollback. The requestor is responsible to issue the error message explaining the cause for the rollback after the rollback call. In an embodiment, a rollback of sync-point is only possible for the last sync-point within the sync-point stack. In an embodiment, each sync-point shall be closed automatically by the sync-point manager after leaving the stack level.

Figure 5:
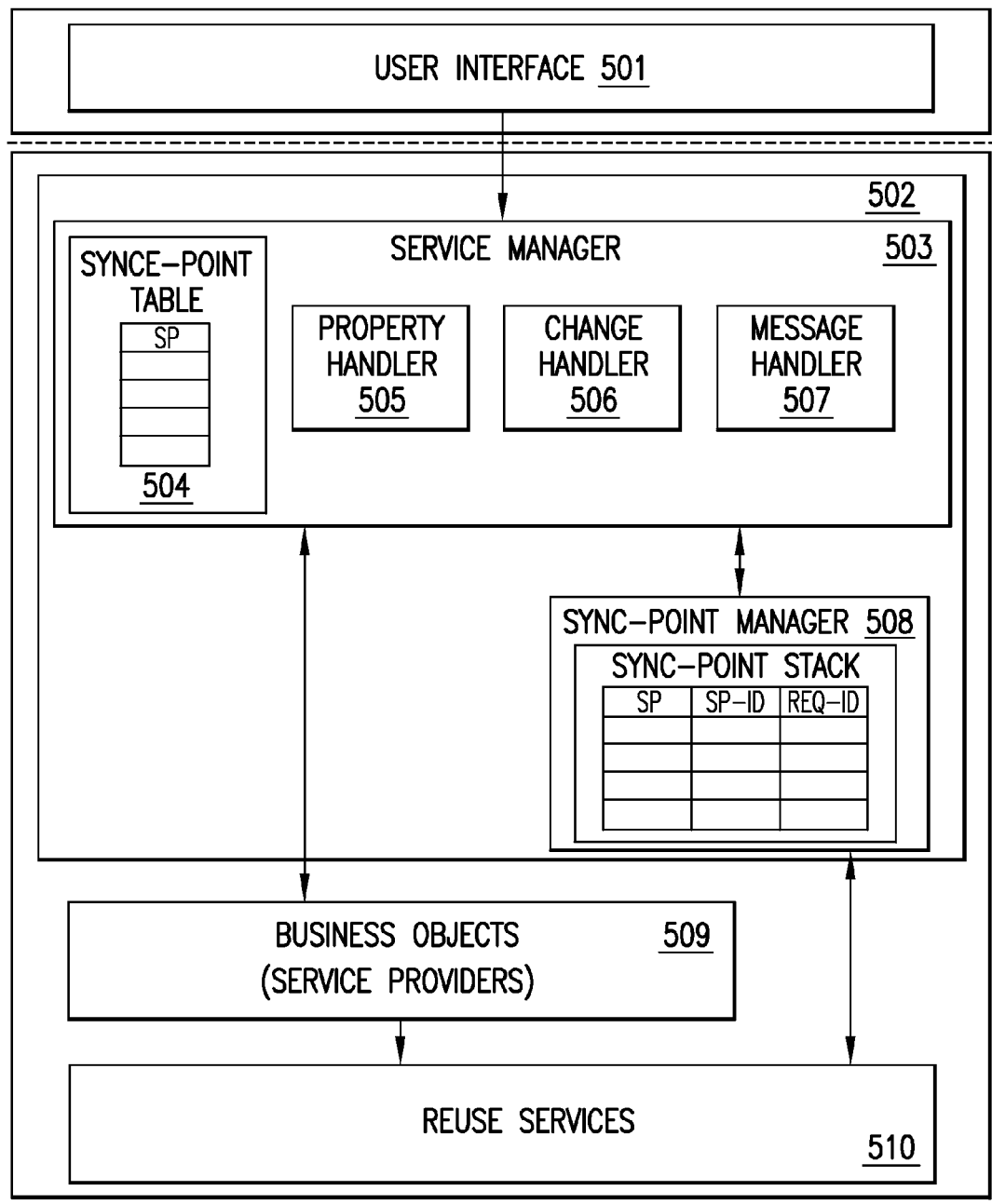
FIG. 5 shows a block diagram illustrating an exemplary framework of the present invention.

FIG. 5 shows a block diagram illustrating an exemplary framework of the present invention. In FIG. 5, the user interface 501 may interact in a system 502, e.g., having an enterprise services architecture framework. The user interface 501 uses the service manager 503 for core service and/or meta-data access. In embodiments of the present invention, the service consumer, like the user interface, may use the service manager for the core service and/or meta-data access. The core services of the business object may be implemented by the service provider(s). Internally, the service providers may use reuse-services or reuse service components. The reuse services and reuse service components are integrated in the sync-point and rollback mechanism and may use the sync-point manager for open, close, and rollback activities. In an embodiment, the reuse services and reuse service components 510 may use the sync-point manager directly. In an embodiment, the reuse services 510 provide technical capabilities, e.g., quantity conversion, price calculations, tax calculations, to be shared between the business objects.

The service manager 503 is responsible for managing and updating the state of the, e.g., property handler 505, change handler 506, and message handler 507. Further, in the rollback scenario the handlers of the service manager must also rollback the messages, the properties, and the change notifications to the requested sync-point. Accordingly, the service manager 503 also has a sync-point table 504. The sync-point table 504 keeps tally of the set sync-points.

The service manager 503 interfaces with the sync-point manager 508. The sync-point manager 508 includes a single stack of sync-points containing sync-point management data, sync-point identifiers, and requester identifiers. The sync-point manager 508 needs to be aware of all sync-points. The sync-point manager is part of the overall server infrastructure and can be used by all entities which are buffering data. The use of the sync-point manager can be used in the enterprise service infrastructure and in other infrastructures.

The service manager uses the sync-point manager to provide the system sync-points e.g., within the finalize phase. In a further embodiment, the service manager provides appropriate interfaces for the business objects or service providers 509 to use the sync-point and rollback mechanism under control of the service providers. In an embodiment, the business object service provider 509 does not use the sync-point service manager 508 directly. As described above, the service manager has a separate sync-point table to manage and provide additional convenient features for the service providers. For example, service providers can be instantiated in a scope when many sync-points are already active. In this case, relevant for the service provider is only the last sync-point because for all other sync-points the service provider is in the initial state. Here, the service manager can manage all previous sync-points and notify the service provider just for the last one.

In a further embodiment, a common instance manager having a running object table may interface with the service manager 503 and with the sync-point manager 508.

Figure 6:
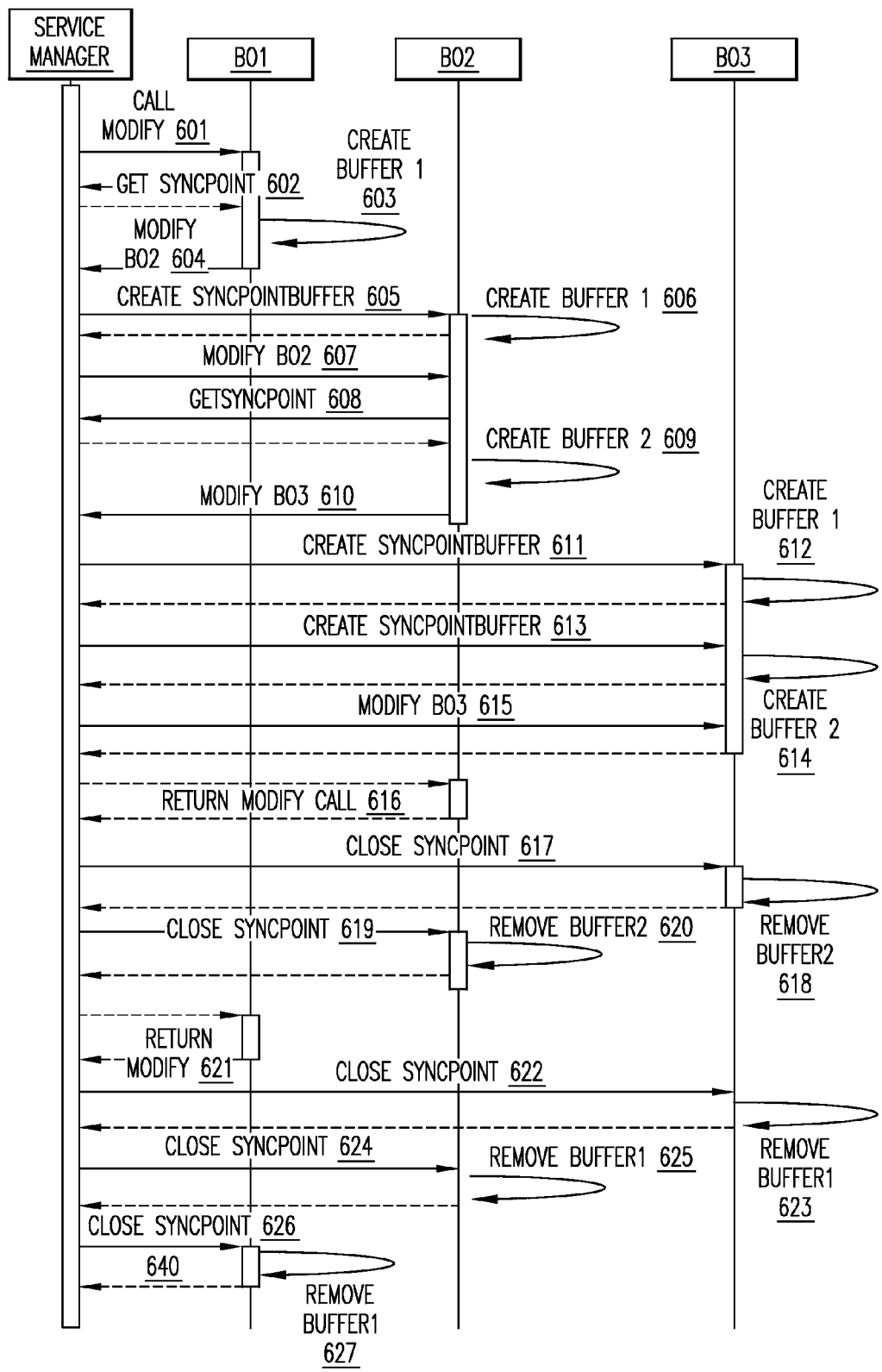
FIG. 6 shows a sequence diagram illustrating an exemplary framework of the present invention.

FIG. 6 shows a sequence diagram illustrating an exemplary framework of the present invention. In this example, a service consumer triggers a modify call to a business object BO1 601. The service provider of the business object BO1 requests a sync-point from the service manager to conduct certain operations under protection of a sync-point 602. The service manager instructs the business object BO1 via a special call to prepare a buffer for the sync-point protection 603. The business object BO1 may trigger a modify call to business object BO2 via the LCP 604. The service manager recognizes that a sync-point is open and after initialization of the BO2, instructs the BO2 to prepare a buffer to run under sync-point protection 605, 606. The modify call from BO1 is now routed to BO2 607. The BO2 requests a sync-point before doing further changes 608. After requesting the sync-point, the service manager calls BO2 to prepare a buffer for the second sync-point and which is then prepared 609. The BO2 next triggers a modify call to another business object BO3 via the LCP 610. At this point, there are two open sync-points on the stack. The service manager informs, after initialization, business object BO3 to prepare a buffer for running under sync-point protection 611, 613 which is then prepared 612, 614. In a further embodiment, for convenience, the service manager has only to call the buffer preparation once. The modify call is now routed to business object BO3 615. The modification is done without any errors and the control goes back to the caller BO2. BO2 has finished his modify call and gives the control back to BO1, BO1 gives the control back to the service manager 616. At this point, the service manager recognizes that the call stack is finished and yet an open sync-point still remains. This sync-point is now automatically closed by the service manager 617, 619. This means that all service providers who received the buffer preparation call for this sync-point now receive the corresponding call to remove the sync-point and make this sync-point buffer to current active buffer BO3 618, and, afterwards, BO2 will get this call to close this sync-point 620. Now, the control is back in the modification of BO1. BO1 finishes the modify without errors and gives back control to the service manager 621. This again triggers a close sync-point call to all service providers which have a pending buffer for sync-point 1 622, 624, 626. Now all buffers which have received the pending changes done under sync-point protection, make the respective sync-point buffer into the current active buffer 623, 625, 627.

Figure 7:
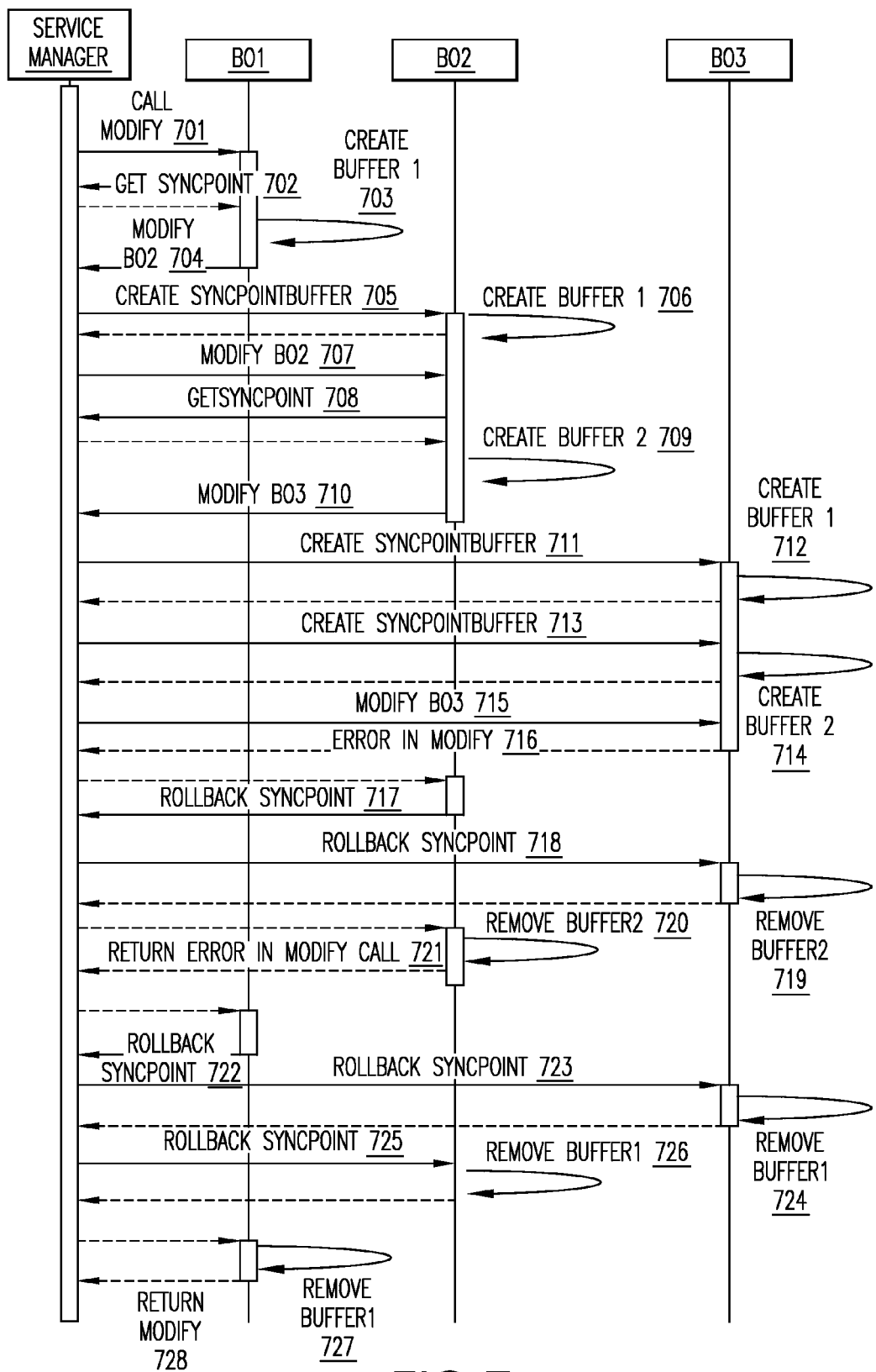
FIG. 7 shows a sequence diagram illustrating an exemplary framework of the present invention.

FIG. 7 shows a sequence diagram illustrating an exemplary framework of the present invention. In this example, a service manager or service consumer triggers a modify call 701 to a first business object BO1. The service provider of the BO1 requests a sync-point from the service manager to conduct operations under protection of a sync-point 702. The service manager enforces BO1 via a special call to prepare his buffer for the sync-point protection 703. The BO1 triggers a modify call to another business object BO2 via the LCP (Link Control Protocol) 704. The service manager now recognizes that a sync-point is open and informs BO2 after the initialization to prepare its own buffer to run under sync-point protection 705, 706. Following this call, the BO1 modify is routed to BO2 707. Accordingly, BO2 requests a sync-point before doing further changes 708. After requesting the sync-point, the service manager calls BO2 to prepare a buffer for the second sync-point 709. Then, BO2 triggers a modify call to business object BO3 710. At this point, there are two open sync-points on the stack, and the service manager informs BO3, after initialization, to prepare a buffer for running under sync-point protection 711, 712, 713, 714. In a further embodiment, the service manager has only to call the buffer preparation once. Following the preparation of the buffer, the modify call is routed to BO3 715. Here, the modification is done but errors occur and the control returns to the caller BO2 716.

The caller BO2 here decides to rollback the changes because of the error occurrence and requests this rollback from the service manager 717. The service manager routes the rollback call to all service providers which have a sync-point call for the last one of the stack 718, 719. The service providers now have to throw away all changes done under this sync-point. BO2 finishes the modification and returns back to the caller BO1 with error messages 720, 721. BO1 decides to rollback the changes because of the error 722. Again all service providers who are informed about the first sync-point now get a rollback call to remove the changes, including the first buffer 723, 724, 725, 726, 727, 728.

It will be understood that the system and communication shown in the figures are exemplary only, and embodiments of the present invention may include more or fewer objects, more or fewer errors pronounced in system embodiments, additional layers, systems, and/or communication. Further, the embodiments of the present invention may be implemented in other systems, and are not limited to use within an enterprise services framework.

The various computer systems described herein may each include a storage component for storing machine-readable instructions for performing the various processes as described and illustrated. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

Although the present invention has been described with reference to examples and embodiments, it is understood that the present invention is not limited to those examples and embodiments. The present invention as claimed therefore includes variations from the specific examples and embodiments described herein, as will be apparent to one of skill in the art. And, the above examples and embodiments may be combined with and without each other.

What is claimed is:

1. A method for allowing a return to an earlier version within a multiple-object infrastructure, comprising:

responsive to a requested change in a first software business object, requesting a first sync point associated with the first object to allow the return to the earlier version;

creating a first buffer contained within the first object to store data relating to the requested change, the first buffer associated with the first sync point;

responsive to the requested change in the first object triggering a first modify call in a second business object, notifying a service manager application component of the first modify call in the second business object;

creating a second buffer contained within the second object and associated with the first sync point to store data relating to the triggered first modify call;

routing the first modify call from the first object to the second object for implementation;

responsive to the first modify call in the second object triggering a second modify call in a third business object, requesting a second sync point associated with the second object;

creating a third buffer contained within the second object and associated with the second sync point to store data relating to the triggered second modify call;

notifying the service manager component of the triggered second modify call;

creating a fourth buffer contained within a third business object and associated with the first sync point to store data relating to the first modify call;

creating a fifth buffer contained within the third object and associated with the second sync point to store data relating to the second modify call;

routing the second modify call to the third object for implementation;

determining whether an error has occurred during change implementation, responsive to an error occurrence, using the sync point and the buffered data associated with at least one of business objects to effect a rollback to the earlier version of the respective business object, and responsive to no error occurrence, removing the buffers in the following order: first, the fifth buffer associated with the second sync point in the third object, then the third buffer associated with the second sync point in the second object, then the fourth buffer associated with the first sync point in the third object, then the second buffer associated with the first sync point in the second object, and last the first buffer associated with the first sync point in the first object.

2. The method of claim 1, wherein each sync point is included in a single stack of sync points in a sync point management system, the single stack used to identify sync points for removal and rollback.

3. The method of claim 1, wherein the rollback is effected before a successful save of the system.

4. The method of claim 1, wherein the rollback is effected automatically responsive to an error.

5. The method of claim 4, wherein sync points are requested at a service provider instantiating each business object and sent to a service manager system that creates the sync points and includes them in a table linking the sync point to a respective business object.

6. The method of claim 4, further comprising initiating the rollback to a first sync point at a first service provider and then routing the rollback to other service providers having sync points affected by the first sync point.

7. The method of claim 2, wherein a sync point manager manages single-level and multiple-level sync points.

8. The method of claim 7, wherein the sync point manager includes a table entry of an authorized rollback requester identifier associated with each of the at least one sync point so that only an authorized rollback requester associated with the authorized rollback requester identifier triggers a rollback to the associated at least one sync point.

9. The method of claim 1, further comprising a service manager to manage and update a respective state of an object handler of a respective software object, wherein responsive to creating a respective software object, the service manager communicates to the respective business object to prepare a buffer associated with a specific sync point if the specific sync point is set.

10. The method of claim 1, wherein the sync points are part of the infrastructure and are capable of being utilized by all entities capable of buffering data.

11. The method of claim 2, wherein the multiple-object infrastructure is an enterprise services architecture framework.

12. The method of claim 1, wherein the rollback spans across multiple business object types.

13. A system for allowing a return to an earlier version within a multiple-object infrastructure, comprising:
a memory device storing a plurality of nested software business objects, the software business objects capable of buffering data;
a service provider to instantiate services in the business objects;
a service manager interfacing with the service provider to manage updates to the business objects, the service manager including a sync point table to tally set sync points;
a sync point manager interfacing with the service manager, the sync point manager including a table of each sync point associated each software business object; wherein
the service manager, responsive to a first modify call at the service provider to a modify a first business object, determines whether a sync point is open;
responsive to no open sync point:
the service provider requests opening of the sync point from the service manager before changing data in the business object;
the service manager directs creation of a first buffer contained within the first business object to store data associated with the modification;
responsive to an open sync point:
the service manager directs creation of a second buffer contained within the first business object, the second buffer storing modification data copied from a buffer of another business object associated with the open sync point, the modification data representing a change to the another business object;
the service provider requests opening of a new sync point from the service manager before changing data in the first business object;
the service manager directs creation of a third buffer contained within the first business object to store data associated with the modification in the first business object; and
the service manager stores data associated with the change in the first business object in the third buffer;
responsive to the requested change in the first object triggering a second modify call in a second business object,
the service manager directs creation of additional buffer(s) contained within the second business object to store modification data copied from the corresponding buffer(s) in the first business object;
the service provider requests opening of a new sync point from the service manager before changing data in the second business object; and
the service manager directs creation of a further buffer contained within the second business object to store data associated with the changed data triggered through the second modify call in the second business object;
responsive to an error occurrence, the service manager accesses the sync points and the buffered data associated with at least one of business objects to effect a rollback to the earlier version of the respective business object; and
responsive to no error occurrence, the service manager removes the buffers in a reverse chronological order where a last added buffer and its corresponding sync points are first removed from each business object containing the last added buffer and corresponding sync points, followed by removal of a next to last buffer and its corresponding sync points from each business object, and so on until each buffer and its corresponding sync points are removed from each business object.

14. The system of claim 13, wherein the system implements the modification of the business object and removes each sync point when no error occurs during the implementation.

15. The system of claim 14, wherein the system uses the buffered data in the business object to return to the earlier version when an error occurs during implementation.

16. The system of claim 14, wherein the table is accessed to identify sync points targeted for removal.

17. The system of claim 14, wherein the table includes a table entry of an authorized rollback requester identifier associated with each of the at least one sync point so that only an authorized rollback requester associated with the authorized rollback requester identifier triggers a rollback to the associated at least one sync point.

18. The system of claim 14, wherein the service manager updates a respective state of an object handler of a business object and communicates to the respective business object to prepare a respective buffer associated with a specific sync point if the specific sync point is set when a respective software object is created.

19. The system of claim 18, wherein the respective buffers associated with the specific sync point are removed from association with the specific sync point when a successful finalize phase occurs.

20. A computer-readable medium including instructions for a processor adapted to execute a method for allowing a rollback within a multi-object system infrastructure, the method comprising:
responsive to a requested change in a first software business object, requesting a first sync point associated with the first object to allow the return to the earlier version;

creating a first buffer contained within the first object to store data relating to the requested change, the first buffer associated with the first sync point;

responsive to the requested change in the first object triggering a first modify call in a second business object, notifying a service manager application component of the first modify call in the second business object;

creating a second buffer contained within the second object and associated with the first sync point to store data relating to the triggered first modify call;

routing the first modify call from the first object to the second object for implementation;

responsive to the first modify call in the second object triggering a second modify call in a third business object, requesting a second sync point associated with the second object;

creating a third buffer contained within the second object and associated with the second sync point to store data relating to the triggered second modify call;

notifying the service manager component of the triggered second modify call;

creating a fourth buffer contained within a third business object and associated with the first sync point to store data relating to the first modify call;

creating a fifth buffer contained within the third object and associated with the second sync point to store data relating to the second modify call;

routing the second modify call to the third object for implementation;

determining whether an error has occurred during change implementation, responsive to an error occurrence, using the sync point and the buffered data associated with at least one of business objects to effect a rollback to the earlier version of the respective business object, and responsive to no error occurrence, removing the buffers in the following order: first, the fifth buffer associated with the second sync point in the third object, then the third buffer associated with the second sync point in the second object, then the fourth buffer associated with the first sync point in the third object, then the second buffer associated with the first sync point in the second object, and last the first buffer associated with the first sync point in the first object.

* * * * *